United States Patent [19]
Carter

[11] 3,793,530
[45] Feb. 19, 1974

[54] WIND TURBINE GENERATOR

[76] Inventor: Frank H. Carter, 428 North St., Taft, Calif. 93268

[22] Filed: Apr. 19, 1972

[21] Appl. No.: 245,341

[52] U.S. Cl. .................................. 290/55, 290/44
[51] Int. Cl. .......................................... F03d 9/00
[58] Field of Search ................ 290/42, 43, 53, 54

[56] References Cited
UNITED STATES PATENTS

| | | | |
|---|---|---|---|
| 1,677,745 | 7/1928 | Bonetto | 290/55 |
| 1,219,339 | 3/1917 | Manning | 290/44 |
| 1,321,415 | 11/1919 | Brown | 290/55 X |
| 1,654,165 | 12/1927 | Felt | 290/55 X |
| 2,517,135 | 8/1950 | Rudisill | 290/44 |
| 1,152,666 | 9/1915 | Sterner | 290/44 |
| 1,315,595 | 9/1919 | Clark | 290/44 X |
| 1,646,723 | 10/1927 | Bonetto | 290/55 X |

*Primary Examiner*—G. R. Simmons
*Attorney, Agent, or Firm*—Clarence A. O'Brien; Harvey B. Jacobson

[57] ABSTRACT

An electric energy generator driven by a wind actuated turbine rotor rotatably supported on a vertically disposed sleeve telescoped over and journaled on a rigid upright supporting post. The rotor includes a plurality of vertically disposed louvers capable of independent pivotal movement about a vertical axis at the inner edge thereof for orientation in radial relation to the rotational axis of the rotor or substantially tangential thereto so that wind will effectively drive the rotor. The rotor is also provided with lift wings on the upper surface thereof which may include stabilizers and shock absorbers fastened to the edge of the wings and the outer edge of the louver support to support part of the load as the rotor whirls in the air thereby providing a floating power device. A wing assembly, which may be hollow and filled with helium gas to reduce the load, is supported on the sleeve above the rotor and includes propeller assemblies mounted thereon to operate the rotor during periods of no wind or only a very slight wind. Governor control means is provided for selectively latching the louvers in tangential relation to the path of movement thereof to prevent the rotor from over-speeding during periods of high wind. Gear assemblies are provided for rotating generators to provide an electrical output that can be used for various purposes thereby utilizing the wind power to produce electrical energy that can be used for various purposes.

6 Claims, 6 Drawing Figures

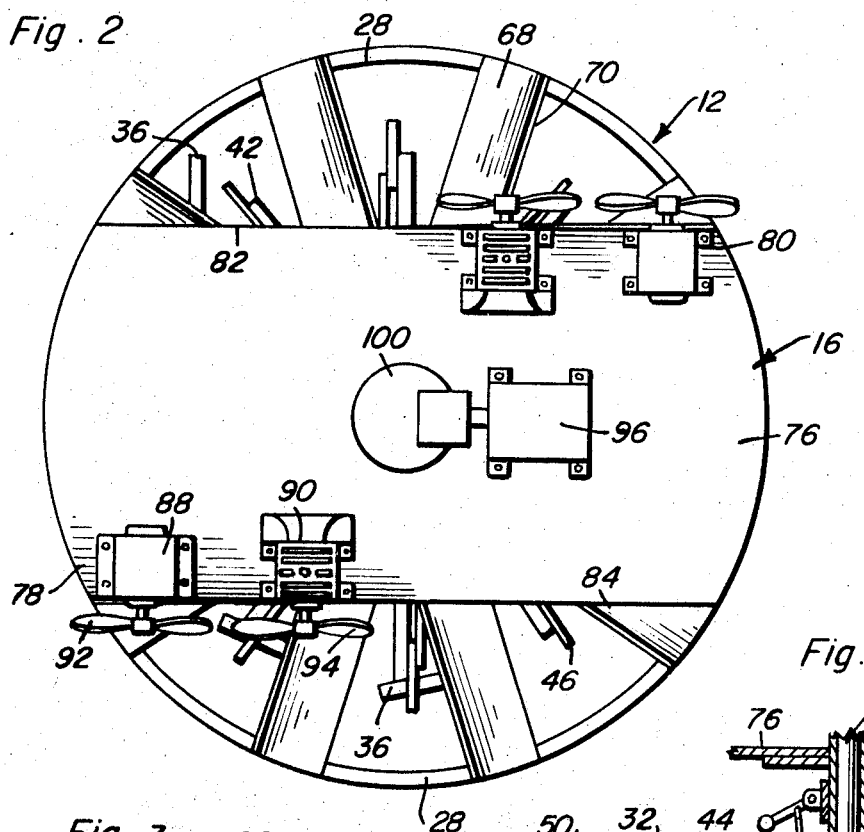
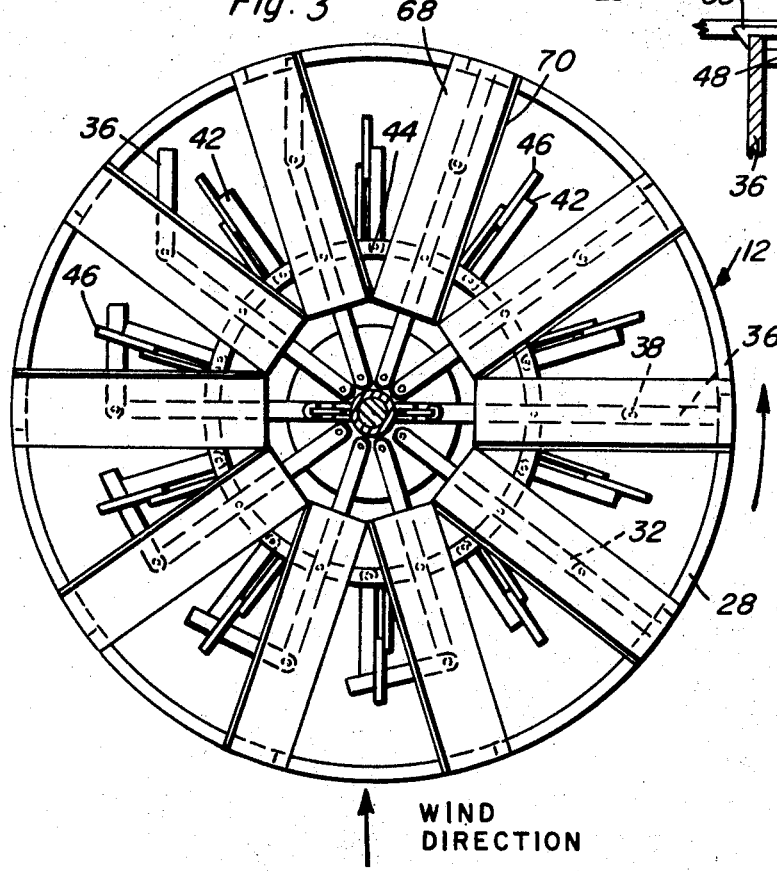
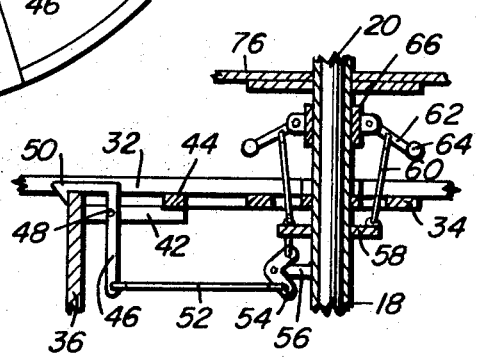

WIND TURBINE GENERATOR

BACKGROUND OF THE INVENTION

1. Field of the Invention

The present invention generally relates to a device for utilizing wind to produce useful energy and more particularly to a turbine that includes a wind driven rotor mounted for rotation about a vertical axis and including features that enable it to efficiently produce useful electrical energy.

2. Description of the Prior Art

Previously known devices for producing electrical energy from the forces available from wind have for one reason or the other not proven successful in operation. One of the problems that has existed is the necessity of supporting a relatively heavy rotor that is driven by the wind. Prior U. S. Pat. No. 1,636,449 issued July 19, 1927, is one example of a known wind motor that is supported by a supporting framework, guy wires and the like. Another problem encountered in this type of device is the dependence upon the wind for actuation thus resulting in the absence of useful power when the wind is not blowing or is blowing at a very slow velocity.

SUMMARY OF THE INVENTION

An object of the invention is to provide a wind driven generator that includes a turbine rotor having louvers thereon which can swing from an active to inactive position, a governor control for selectively locking the louvers in inactive position to control the speed of the rotor, lift winds on the rotor to support a portion of the weight thereof, a novel supporting arrangement for the rotor including a vertically elongated and continuous sleeve telescoped over and rotatably supported by an elongated vertically disposed post that is rigidly supported from the ground surface or any other supporting surface such as the top of a building or the like in a well known manner thereby providing an effective and stable support for the rotor as well as an efficient rotor that can be accurately controlled to prevent over heating.

Another object of the invention is to provide a generator in accordance with the preceding object together with a wing assembly mounted on the sleeve above the rotor which also introduces lift to the rotor and sleeve assembly and includes propeller assemblies thereon for propelling the rotor during periods of no wind or wind at very low velocity thereby assuring a continuous output of electrical energy.

A further object of the invention is to provide a generator in accordance with the preceding objects together with a novel gear assembly drivingly interconnecting the rotor and sleeve with a generator to effectively guide the generator at a desired rotational speed from the rotor which may be driven at variable speeds depending upon the wind velocity.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a top plan view of the construction of FIG. 1.

FIG. 3 is a plan, sectional view of the rotor taken substantially upon a plane passing along section line 3—3 of FIG. 1 illustrating the rotor and louver structures thereon together with the lifter wings on the upper end of the rotor.

FIG. 4 is a fragmental sectional view illustrating the governor structure and the mechanism for selectively latching the louvers in their inactive position for preventing over-speeding of the rotor.

DESCRIPTION OF THE PREFERRED EMBODIMENT

Figure 6:
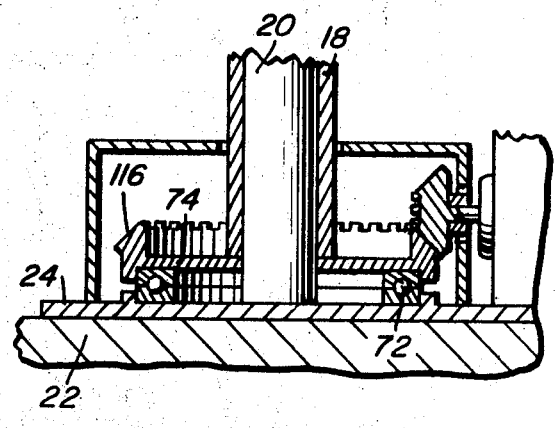
FIG. 6 is a detailed sectional view illustrating the gear assembly drivingly connecting the lower end of the sleeve with a generator.

Referring now specifically to the drawings, the numeral 10 generally designates the wind driven turbine generator of the present invention which includes a substantially cylindrical rotor 12 that is supported for rotation about a vertical axis with the rotor 12 being controlled by a governor assembly generally designated by numeral 14 and having a wing assembly 16 connected thereto and disposed generally above the upper end of the rotor a sufficient distance to provide space for the governor 14. The rotor 12 is rigidly connected to an elongated vertically disposed tubular sleeve 18 which may be in the form of a rigid pipe or the like with the sleeve 18 being journaled on and supported by a vertically disposed post 20 which may also be in the form of a rod or pipe that is rigidly affixed to a supporting surface 22 by any suitable means depending upon the nature of the supporting surface 22. As illustrated in FIG. 6, a rigid mounting plate 24 may be provided on the lower end of the post for support thereof although any suitable means may be provided for rigidly supporting the post 20.

The rotor 12 includes a bottom annular frame 26 and a top annular frame 28 rigidly interconnected by bracing 30 to provide a rigid open framework with the annular members being supported by radial arms 32 attached to a central flange or plate 34 that is rigid with the sleeve 18.

Mounted between vertically aligned pairs of arms 32 is a plurality of vertically disposed substantially flat louvers 36 which have their inner edge pivoted to the arms 32 by a pivot pin, bolt, rod or the like 38 which enables the louvers 36 to swing from a position co-extensive with a radial axis of the rotor to a position substantially tangential thereof as illustrated in FIG. 3. When the louver 36 is in the operative or active position, it rests against a stop member 40 on the annular member 28 with the stop members 40 also being on the annular member 26 if desired. When the louver 36 is in the inactive position, it rests against a stop frame or stop member 42 that is supported in circumferentially spaced relation to the arms 32 and generally in circumferential alignment with the pivot axis 38 so that when the louvers are swung to their inactive position, they will rest against the stop frame or stop member 42. The stop members 42 are secured to a pair of annular members 44 secured to the arms 32 thereby enabling the louvers on one side of the rotor to be active so that when impinging thereon will cause the rotor to rotate whereas the louvers on the opposite side of the rotor will automatically swing to inactive position so that wind impinging thereon will not produce a driving force thereby enabling the rotor to rotate due to the force of the wind impinging upon the louvers that are disposed radially of the axis of rotation on only one side of the rotor.

A latch structure is provided for each of the louvers 36 to selectively retain them in their inactive position in the event of the rotor exceeding a predetermined maximum rotational speed. The latch members are in the form of an L-shaped member 46 having the vertical leg thereof pivoted to the stop member 42 by a pivot pin 48 and the horizontal leg thereof extending above the top edge of the louver 36 and provided with a down turned latching end 50 that is provided with a slanted outer end forming a cam surface for camming the horizontal arm of the latch member upwardly so that the latching end 50 can drop down and engage the outer surface of the louver 36 to retain it against the outer end of the stop member 42 as illustrated in FIG. 4. The lower end of the L-shaped latch member 46 is connected to an actuating rod 52 that extends radially inwardly and is connected to one end of a bell crank 54 anchored to the sleeve 18 by suitable bracket 56 or the like. The opposite end of the bell crank 54 is connected to a sliding flange or plate 58 on the sleeve which is vertically reciprocated by links 60 that extend upwardly and are attached to arcuately swingable governor arms 62 that have weights 64 on the outer end thereof and which are pivotally attached to a sleeve 66 which is rigidly fixed to the sleeve 18 for rotation thereof. Thus, as speed of the sleeve 18 rotates, the weights 64 will swing outwardly due to centrifugal force thus actuating the links 60 and the plate or flange 58 thereby pivoting all of the bell cranks 54 and moving all of the latch members 46 into a position where they will engage the louver 36 when the louver is moved to an inactive position thus latching the louver in the inactive position. As the speed of the rotor slows, the weights 64 will drop downwardly and inwardly thus raising the latched end 50 of each of the latch members 46 upwardly to disengage it from the louvers. A spring device may be incorporated into the linkage so that the louver may move inwardly of the latching end 50 and it will then spring into engagement with the louver 36. Thus, the governor will move the latch members 46 from an inactive position as long as the speed of the rotor is normal to an active position when the rotor speed exceeds a predetermined maximum. The louvers will automatically move from their active position to their inactive position as they rotate due to impingement of air thereon. For example, in FIG. 3, if the wind is in the direction from the bottom of the sheet of drawings, the louvers to the left of the center of rotation will move to an inactive position whereas the louvers to the right of the axis will automatically move to their active position and cause rotation of the rotor.

Mounted on the upper end of the rotor 12 is a plurality of radially disposed lift wings or blades 68 which have their outer ends rigid with the upper annular member 28 and their inner ends connected to each other and connected to the radial arms 32. Each of the blades 68 have the leading edge thereof elevated as indicated by numeral 70 so that as the rotor rotates in the counterclockwise direction, the blades or wings 68 will introduce a vertical lifting force to the rotor for supporting some of the weight thereof. This reduces the load to be supported by the base plate 24 and the bearing assembly 72 thereon which is associated with the base plate 24 and a flange 74 rigid with the lower end of the sleeve 18 thereby reducing the frictional resistance to rotation of the rotor 12 thereby increasing the efficiency of the rotor 12 utilizing the forces of the wind for producing a useful output of energy.

Mounted above the rotor 12 and the governor assembly 14 is the wing assembly 16 which includes a substantially horizontally disposed wing 76 which is provided with substantially parallel side edges and arcuate end edges with the width of the wing 76 being substantially greater than the width of the blades or wings 68. The wing 76 has leading edge portions 78 and 80 which are slanted upwardly and elevated above the trailing edge portions 82 and 84 to provide an additional lifting force to the sleeve inasmuch as the wing 78 is rigidly secured thereto such as by the use of a mounting flange 86. Mounted on the wing 76 is a pair of propeller drive assemblies 88 and 90 each of which include a drive propeller 92 and 94 disposed forwardly of the respective leading edges 78 and 80 as illustrated in FIG. 2 which are for the purpose of driving the wing assembly 16 and rotor 12 when there is no wind or the wind is at a very low velocity in a manner described hereinafter.

Figure 1:
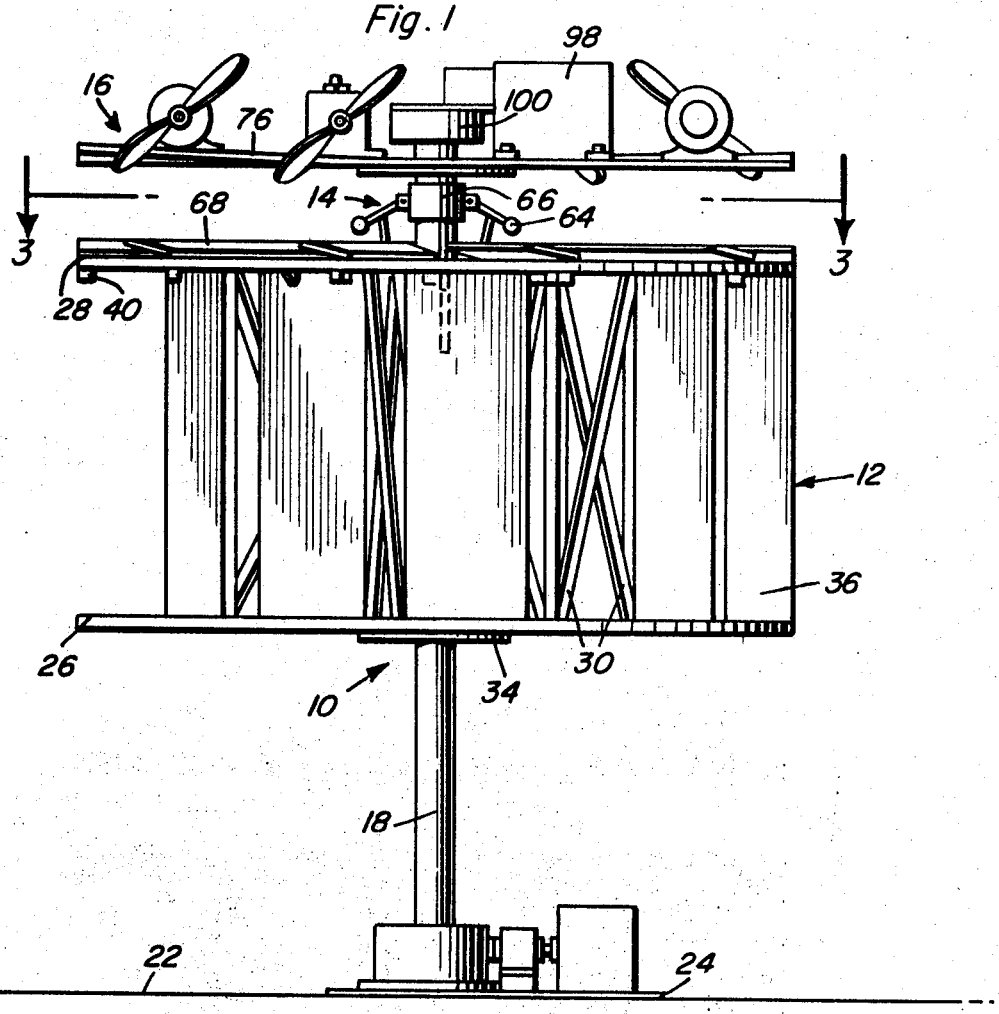
FIG. 1 is a side elevational view of the wind turbine generator of the present invention illustrating generally the relationship of the components thereof.
Figure 5:
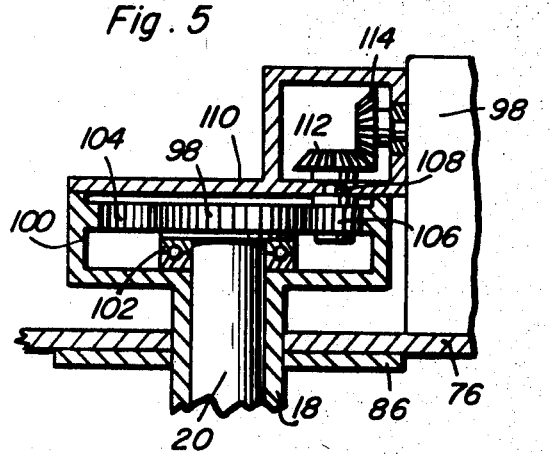
FIG. 5 is a detailed sectional view of the gear assembly drivingly connected with the generator mounted on the wing above the rotor.

One of the propellers is driven by an internal combustion engine 90 which may be in the form of a relatively small air cooled gasoline engine, diesel engine or the like. The other of the propellers 92 is driven by an electric motor that is powered from a generator 96 mounted on the wing 76 and driven from a gear connection with the stationary post 20 as illustrated in FIG. 5 which includes a stationary gear 98 on the upper end of the post and a housing 100 rigid with the upper end of the sleeve 18 which the gear 98 being provided with a bearing 102 between the housing 100 and the gear 98. The peripheral wall of the housing 100 is provided with a ring gear 104 spaced concentrically from the gear 98 with a small planet gear 106 meshing with the gears 98 and 104 and being supported by a shaft 108 journaled in the top wall 110 of the housing 100. The shaft 108 is provided with a bevel gear 112 on the upper end thereof in meshing engagement with a bevel 114 which drives the generator 96 with all of the gears being enclosed and provided with suitable lubrication and provided with suitable ratios to enable the generator to provide an effective electrical output.

The lower end of the sleeve 18 which has the plate 74 thereon is also provided with a ring gear 116 in the form of a bevel gear in meshing engagement with a bevel gear 118 that drives generator 120 with these gears being enclosed and also provided with suitable lubrication as deemed necessary and provided with an appropriate ratio for driving the generator at a desired rotational speed. Also, a variable speed drive may be employed in order to provide a constant rotational speed of the generator regardless of variation in the rotational speed of the sleeve 18. Also, suitable remote controls and wiring is provided to enable the electrical energy produced by the generator 96 to be utilized with the propellers and motors on the wing 76 not being employed unless the wind velocity is very low. In this event, the motors 90 may be remotely actuated in a well known and conventional manner which will cause the wing and rotor to rotate which produces electrical energy by virtue of the generator 96. The electric motors 88 may then be energized and employed to rotate the wing 76 either with or without the internal combustion engine 90 or a source of electrical potential such as a battery, or the like.

Depending upon the size and output desired in each installation, variation in the size and number of components may vary. For example, two or more concentric sets of louvers may be provided with each louver having its own governor for latching or releasing the louvers independently and at different speeds to provide a more accurate speed control. Also, as many as twenty reduction gear assemblies may be used and the blade assembly may be oriented several feet above the louver assembly with the outer ends of the blades connected thereto by stabilizers and shock absorbers. Additionally, the lift wing may be hollow in construction and filled with helium to support at least part of the weight of the apparatus to provide a floating support arrangement.

The specific structural details of the bearings, supporting embedment of the post into the ground surface or other support, lubrication features and other minor details of conventional construction have not been included inasmuch as it is the principle of operation as disclosed which is believed novel.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A wind turbine generator comprising a rigidly mounted supporting post, a rotor assembly including a vertically elongated tubular sleeve telescoped over the post and rotatably journaled therefrom, a rotor mounted on said sleeve for rotation therewith, said rotor including a pair of vertically spaced annular frame structures, a plurality of vertically disposed louvers mounted in circumferentially spaced relation around the axis of rotation of the rotor, said louvers being substantially flat blades, means mounting said louvers between the frame structures for free pivotal movement about an axis at the inner edge portion thereof from an active to inactive position so that the louvers to one side of the axis of rotation will be active while the louvers on the other side of the axis of rotation will be inactive so that wind impinging against the active louvers will rotate the rotor assembly, stops on said frame structures for limiting the free pivotal movement of the louvers between an active generally radial position and an inactive generally tangential position, means selectively retaining the louvers in inactive position in response to over-speeding of the rotor assembly thereby limiting the maximum rotational speed of the rotor, said rotor defining a substantially open frame to eliminate the trapping of air therein, and generator means drivingly connected with the sleeve for producing electrical energy when the rotor and sleeve are rotatably driven by the wind.

2. The structure as defined in claim 1 wherein said rotor assembly includes lift blades thereon for lifting a portion of the rotor assembly during rotation thereof to reduce the supported load thus reducing friction.

3. The structure as defined in claim 1 wherein said rotor assembly includes a wing member mounted above the rotor and rigid with said sleeve, said wing member including an elevating leading edge to lift a portion of the weight of the rotor assembly to reduce friction.

4. The structure as defined in claim 3 wherein propeller means is mounted on the wing, power means driving said propeller means for rotating the assembly rotor during periods of low velocity wind.

5. The structure as defined in claim 1 wherein said means selectively locking the louvers in inactive position includes a governor operatively connected to the rotor assembly for rotation therewith and including output means movable in response to overspeeding of the rotor assembly, latch means connected with the output means of the governor and movable to operative position in response to over-speeding of the rotor assembly, said latch means when moved to operative position being disposed for engagement with the louvers when in inactive position.

6. The structure as defined in claim 5 wherein said latch means in said operative position is disposed to engage and retain each louver individually when moved to its inactive position, and wherein said latch means in its inoperative position releases all of said louvers.

* * * * *